US011550828B2

(12) United States Patent
Harper et al.

(10) Patent No.: US 11,550,828 B2
(45) Date of Patent: *Jan. 10, 2023

(54) SYSTEMS AND METHODS FOR INDEXING GEOLOGICAL FEATURES

(71) Applicant: Elsevier, Inc., New York, NY (US)

(72) Inventors: Corey A. Harper, Brooklyn, NY (US); Chi Yeung Cheung, North Bergen, NJ (US); Sandra Merten, Amsterdam (NL); Antony Jason Scerri, Surrey (GB)

(73) Assignee: ELSEVIER INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/344,081

(22) Filed: Jun. 10, 2021

(65) Prior Publication Data
US 2021/0303604 A1 Sep. 30, 2021

Related U.S. Application Data

(63) Continuation of application No. 16/597,116, filed on Oct. 9, 2019, now Pat. No. 11,061,940, which is a (Continued)

(51) Int. Cl.
*G06F 16/00* (2019.01)
*G06F 16/29* (2019.01)
(Continued)

(52) U.S. Cl.
CPC ............ *G06F 16/29* (2019.01); *G06F 16/325* (2019.01); *G06F 16/3334* (2019.01);
(Continued)

(58) Field of Classification Search
CPC .... G06F 16/29; G06F 16/325; G06F 16/3334; G06F 16/353; G06F 16/387; G06F 2221/2111; G09B 29/007; G09B 29/10
See application file for complete search history.

(56) References Cited

U.S. PATENT DOCUMENTS

| | | |
|---|---|---|
| 7,324,666 B2 | 1/2008 | Zoken et al. |
| 7,912,837 B2 | 3/2011 | Buron et al. |
| (Continued) | | |

FOREIGN PATENT DOCUMENTS

| | | | |
|---|---|---|---|
| CN | 103353894 A | 10/2013 | |
| CN | 108241728 A * | 7/2018 | ............. G06F 16/00 |
| (Continued) | | | |

OTHER PUBLICATIONS

Y. Huang, "A Latent Semantic Analysis-Based Approach to Geographic Feature Categorization from Text," 2011 IEEE Fifth International Conference on Semantic Computing, 2011, pp. 87-94, doi: 10.1109/ICSC.2011.15. (Year: 2011).*

(Continued)

*Primary Examiner* — Diedra McQuitery
(74) *Attorney, Agent, or Firm* — Dinsmore & Shohl LLP

(57) ABSTRACT

Systems and methods for indexing geological features are disclosed. In one embodiment, a method for indexing geological features includes accessing a database storing a plurality of map objects that originate from documents. Each map object includes a map defined by a geographical boundary and a text caption. The method includes, for each map object, determining a plurality of geohashes within the geographical boundary, and includes, for each map object, comparing terms of the text caption with a list of geological keywords. For each map object, the method includes identifying one or more geological noun phrases within the text caption that match one or more geological noun phrases of the list. The method includes determining, for each geological noun phrase, one or more geohashes associated with the geological noun phrase and, for each geohash, determining a frequency that the geohash is associated with the geological noun phrase.

20 Claims, 11 Drawing Sheets

Related U.S. Application Data continuation of application No. PCT/US2019/031902, filed on May 11, 2019.

(60) Provisional application No. 62/670,216, filed on May 11, 2018.

(51) Int. Cl.
*G06F 16/35* (2019.01)
*G06F 16/33* (2019.01)
*G06F 16/31* (2019.01)
*G06F 16/387* (2019.01)

(52) U.S. Cl.
CPC .......... *G06F 16/353* (2019.01); *G06F 16/387* (2019.01); *G06F 2221/2111* (2013.01)

(56) References Cited

U.S. PATENT DOCUMENTS

| | | | |
|---|---|---|---|
| 8,650,024 | B1 | 2/2014 | Snellman et al. |
| 9,020,941 | B1 | 4/2015 | Gupta et al. |
| 10,324,935 | B1* | 6/2019 | Patton ............... G06F 16/24575 |
| 10,810,235 | B1 | 10/2020 | Bakshi |
| 2003/0200192 | A1 | 10/2003 | Bell et al. |
| 2007/0150199 | A1 | 6/2007 | Riise et al. |
| 2009/0132469 | A1 | 5/2009 | White et al. |
| 2010/0046842 | A1* | 2/2010 | Conwell ............ H04N 1/00307 382/218 |
| 2010/0100537 | A1* | 4/2010 | Druzgalski ......... H04L 12/1859 707/750 |
| 2013/0097163 | A1 | 4/2013 | Oikarinen et al. |
| 2014/0129566 | A1 | 8/2014 | Chang et al. |
| 2015/0254276 | A1 | 9/2015 | Oliver et al. |
| 2015/0261786 | A1* | 9/2015 | Xu .......................... G06F 16/29 707/747 |
| 2016/0321351 | A1 | 11/2016 | Mor et al. |
| 2017/0068689 | A1* | 3/2017 | Sato ....................... G01S 19/50 |
| 2017/0286457 | A1 | 10/2017 | Natarajan et al. |
| 2018/0095977 | A1* | 4/2018 | Reddy ............... G06F 16/24575 |
| 2018/0182381 | A1 | 6/2018 | Singh et al. |
| 2018/0336224 | A1* | 11/2018 | Ioup ..................... G06F 16/137 |

FOREIGN PATENT DOCUMENTS

| | | |
|---|---|---|
| CN | 110209748 A | 9/2019 |
| WO | WO-2019070412 A1 * | 4/2019 |

OTHER PUBLICATIONS

R. Kasturi, R. Fernandez, M. L. Amlani and W. . -C. Feng, "Map data processing in geographic information systems," in Computer, vol. 22, No. 12, pp. 10-21, Dec. 1989, doi: 10.1109/2.42028. (Year: 1989).*

A. Ramisa, F. Yan, F. Moreno-Noguer and K. Mikolajczyk, "BreakingNews: Article Annotation by Image and Text Processing," in IEEE Transactions on Pattern Analysis and Machine Intelligence, vol. 40, No. 5, pp. 1072-1085, May 1, 2018, doi: 10.1109/TPAMI.2017.2721945. (Year: 2018).*

International Search Report and Written Opinion for PCT Application No. PCT/US19/031902, dated Aug. 26, 2019.

Y. Huang, "A Latent Semantic Analysis-Based Approach to Geographic Feature Categorization from Text," 2011 IEEE Fifth International Conference on Semantic Computing, Palo Alto, CA, USA, 2011, pp. 87-94, doi: 10.1109/ICSC.2011.15. (Year: 2011).

V. Khatavkar and P. Kulkarni, "Use of noun phrases in identification of a website," 2017 International Conference on Big Data, IoT and Data Science (BID) Pune, 2017, pp. 103-109, doi: 10.1109/BID.2017.8336581. (Year: 2017).

J. E. Williams, M. L. Allison and J. B. Kozman, "Improving accessibility to geospatial data using geographic search," 2009 17th International Conference on Geoinformatics, Fairfax, VA, USA, 2009, pp. 1-4, doi: 10.1109/GEOINFORMATICS.2009.5293479 (Year: 2009).

* cited by examiner

SYSTEMS AND METHODS FOR INDEXING GEOLOGICAL FEATURES

CROSS-REFERENCE TO RELATED APPLICATION

This application is a continuation of U.S. patent application Ser. No. 16/597,116 entitled "Systems and Methods for Indexing Geological Features" filed on Oct. 9, 2019, which is a continuation of International Application No. PCT/US19/31902 entitled "Systems and Methods for Indexing Geological Features" filed on May 11, 2019, which claims priority to U.S. Provisional Patent Application No. 62/670,216 entitled "Systems and Methods for Geological Feature Geocoding" filed on May 11, 2018, the entirety of which is hereby incorporated by reference herein in its entirety.

BACKGROUND

Field

The present specification generally relates to systems and methods for geocoding and, more particularly, to systems and methods for indexing geological features.

Technical Background

Geological features are distinct features found around the globe. They include rivers, faults, canyons, cratons, seamounts, and the like. Unlike buildings such as houses and businesses, geological features do not have street addresses and therefore may be difficult to geocode and index. Current geocoding processes for geological features may be difficult and computationally expensive.

Accordingly, a need exists for alternative systems and methods for indexing geological features.

SUMMARY

In one embodiment, a method for indexing geological features includes accessing, by a processor, a database storing a plurality of map objects that originate from a plurality of documents. Each map object includes a map defined by a geographical boundary and a text caption. The method further includes, for each map object, determining, by the processor, a plurality of geohashes within the geographical boundary. Additionally, the method includes, for each map object, comparing terms of the text caption with a list of geological keywords and, for each map object, identifying one or more geological noun phrases within the text caption that match one or more geological noun phrases of the list of geological keywords. For each map object, the method includes storing the plurality of geohashes and the one or more geological noun phrases associated with the map object in one or more non-transitory computer-readable mediums. The method further includes determining, for each geological noun phrase stored in the one or more non-transitory computer-readable mediums, one or more geohashes associated with the geological noun phrase and, for each geohash, determining a frequency that the geohash is associated with the geological noun phrase. The method also includes storing, for each geological noun phrase, the one or more geohashes associated with the geological noun phrase and the frequency that the geohash is associated with the geological noun phrase in the one or more non-transitory computer-readable mediums.

According to another embodiment, a system configured for indexing geological features includes one or more hardware processors configured by computer-readable instructions. The processor(s) is configured to access a database storing a plurality of map objects that originate from a plurality of documents. Each map object includes a map defined by a geographical boundary and a text caption. The processor(s) is configured to, for each map object, determine a plurality of geohashes within the geographical boundary. The processor(s) are configured to, for each map object, compare terms of the text caption with a list of geological keywords. The processor(s) is further configured to, for each map object, identify one or more geological noun phrases within the text caption that match one or more geological noun phrases of the list of geological keywords. The processor(s) is configured to, for each map object, store the plurality of geohashes and the one or more geological noun phrases associated with the map object in a dataframe in one or more computer-readable mediums. The processor(s) is further configured to determine, for each geological noun phrase stored in the one or more non-transitory computer-readable mediums, one or more geohashes associated with the geological noun phrase and, for each geohash, determining a frequency that the geohash is associated with the geological noun phrase. The processor(s) is further configured to store, for each geological noun phrase, the one or more geohashes associated with the geological noun phrase and the frequency that the geohash is associated with the geological noun phrase in the one or more non-transitory computer-readable mediums.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Embodiments of the present disclosure are generally directed to systems and methods for indexing geological features found in maps within documents by geocoding. Generally, geocoding is the process of converting a map feature into one or more geographic coordinates that point to a specific point on the Earth. A geohash is a string of characters and numbers that provide a shortened and simplified version of a geographic coordinate. A geographic coordinate may be encoded into a geohash. Conversely, a geohash may be decoded to determine the represented geographic coordinate.

Presently, the process of geocoding geological features, such as cratons, shields, faults, mesas, and the like is time consuming and computationally expensive. Embodiments of the present disclosure automatically geocode geological features that are referenced by maps within documents, such as journal articles. Particularly, the systems and methods described herein extract maps and captions from journal articles (as well other documents in some embodiments) and store such information in a database. Geological noun phrases regarding geological features of interest (e.g., cratons, rivers, shields, and the like) are extracted from the map captions along with the geological boundaries of the maps. A set of geohashes are determined for each map and are associated with each geological noun phrase in the map caption associated with the map. An index is built that comprises a plurality geological noun phrases and, for geological noun phrase, one or more geohashes and a frequency for which the geohash occurs with (i.e., associated with) the geological noun phrase in the database. The index may be indexed by a geological noun phrase such that an entry would include a geological noun phrase, a geohash, and a frequency that the geohash is paired with the particular geographical noun phrase.

The index may be utilized for a wide variety of end-user applications, such as the ability to look up geological features using a text search query and receive back a map of the geological feature and articles that reference that geological feature (e.g., a map of the San Andreas Fault and over three-hundred journal articles about the San Andreas Fault). The embodiments of the present disclosure may significantly reduce the amount of processing power required to geocode the maps within the journal articles. Additionally, textual documents not containing maps can be assigned geographical locations for map-based search. Such documents may include presentation documents, word processing documents, portable document format (PDF) files, or any other textual documents, which can, in turn, support third-party data integration efforts.

Figure 1:
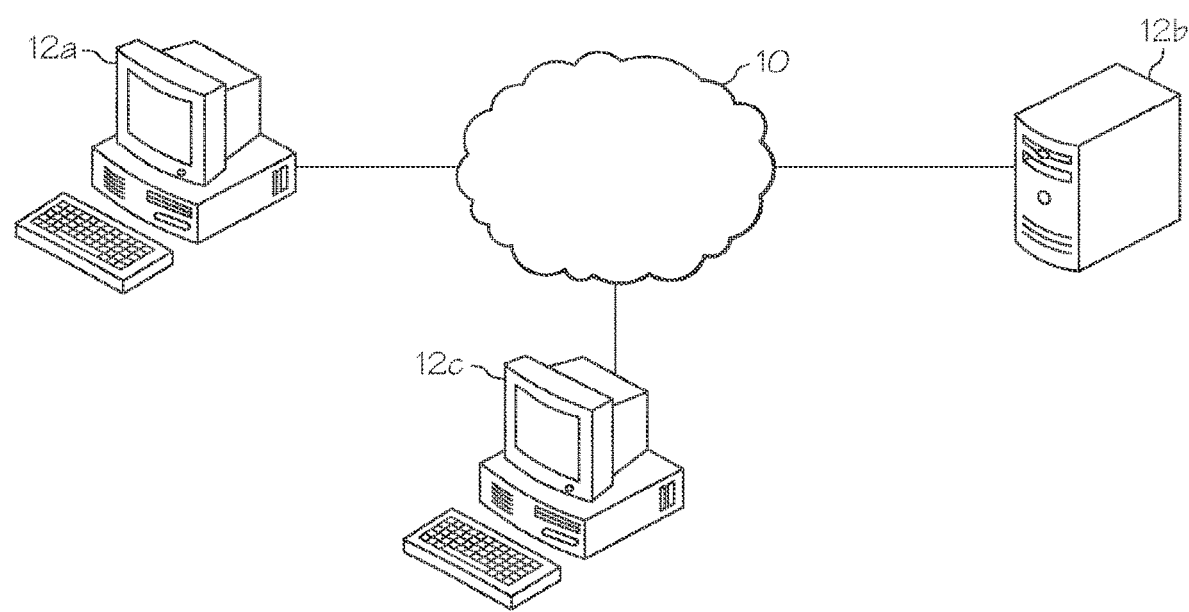
FIG. 1 depicts a schematic illustration of a computer system for indexing geological features according to one or more embodiments described and illustrated herein.

Referring now to the drawings, FIG. 1 depicts an exemplary computing network, illustrating components for a system for indexing geological features, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c. It should be understood that the non-limiting system illustrated in FIG. 1 is provided for illustrative purposes only, and that other configurations are also possible. Further, in some embodiments, the methods may be performed not on a system or network, but locally within a single computing device, such as a personal computer, smart phone, and the like. For example, the embodiments described herein may be incorporated into an operating system running on a computing device to search for documents stored locally on the computing device.

In the exemplary computing network, the user computing device 12a may be used to index geological features. The user computing device 12a may also be utilized to perform other user functions. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to input one or more documents into the electronic document corpus.

The user computing device 12a and the server computing device 12b may be capable of displaying the graphical user interfaces described herein below, such that users may generate maps of desired geological features using the geological feature indices described herein.

It should be understood that while the user computing device 12a and the administrator computing device 12c are depicted as personal computers and the server computing device 12b is depicted as a server, these are non-limiting examples. More specifically, in some embodiments any type of computing device (e.g., mobile computing device (smart phone, tablet computer, laptop computer, etc.), personal computer, server, etc.) may be utilized for any of these components. Additionally, while each of these computing devices are illustrated in FIG. 1 as a single piece of hardware, this is also merely an example. More specifically, each of the user computing device 12a, server computing device 12b, and administrator computing device 12c may represent a plurality of computers, servers, databases, mass-storage devices, etc.

Figure 2:
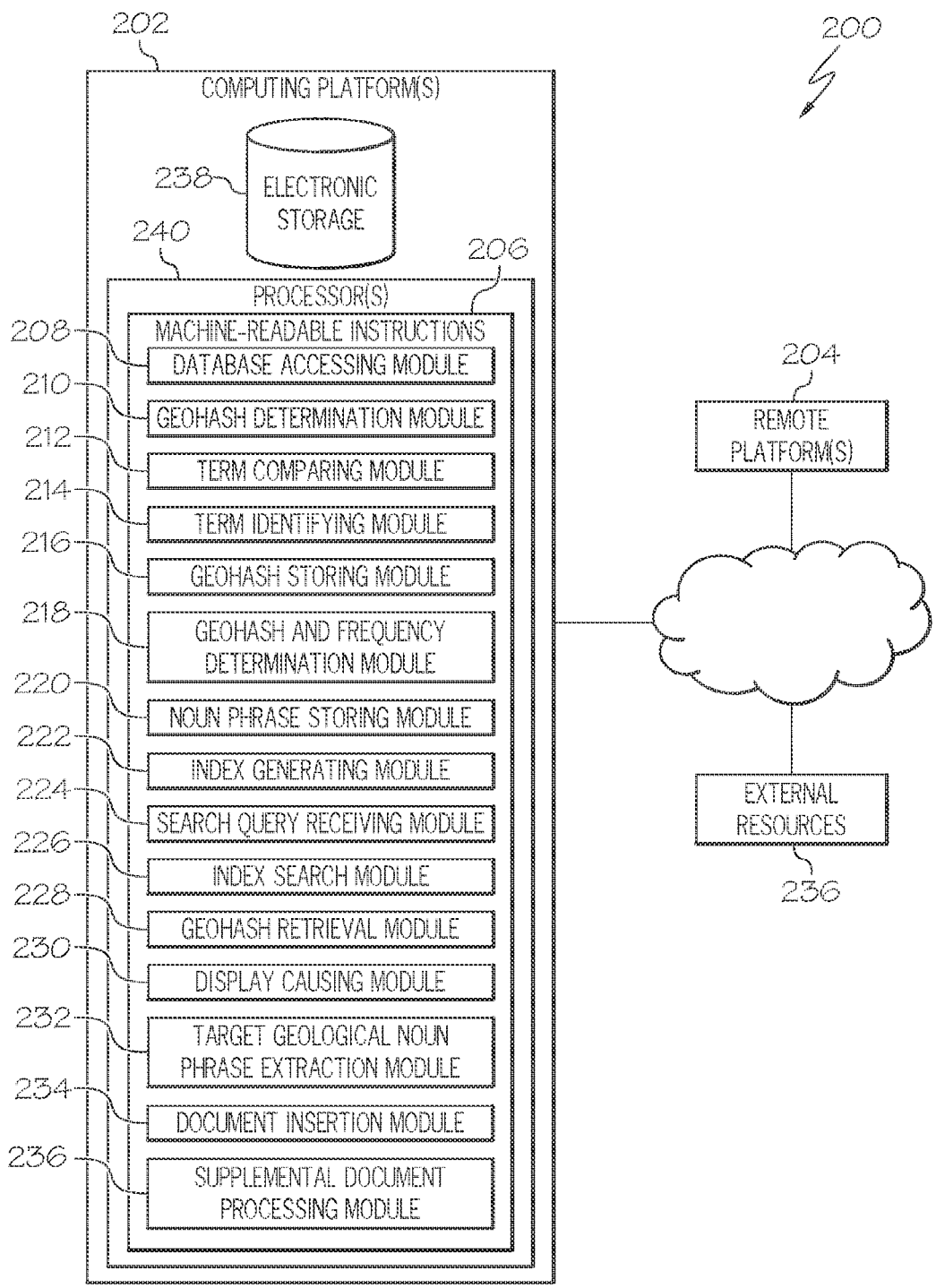
FIG. 2 illustrates a system configured for indexing geological features according to one or more embodiments described and illustrated herein.

FIG. 2 illustrates a system 200 configured for indexing geological features according to one or more embodiments described and illustrated herein. In some embodiments, system 200 may include one or more computing platforms 202. A given computing platform 202 may be the same as or similar to the server computing device 12b, user computing device 12a, and/or administrator computing device 12c, depicted in FIG. 1. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by computer-readable instructions 206. Computer-readable instructions 206 may include one or more computer-readable instructions configured as instruction modules. As non-limiting examples, the instruction modules include one or more of a database accessing module 208, a geohash determination module 210, a term comparing module 212, a term identifying module 214, a geohash and noun phrase storing module 216, a geohash and frequency determination module 218, a noun phrase storing module 220, an index generating module 222, a search query receiving module 224, an index search module 226, a geohash retrieval module 228, a display module 230, a target geological noun phrase extraction module 232, a document insertion module 234, and/or other instruction modules.

In some embodiments, computing platform(s) 202, remote platform(s) 204, and/or external resources 236 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 236 may be operatively linked via some other communication media. Computing platform(s) 202, remote platform(s) 204, and/or external resources 236 may include network interface hardware including one or more of any wired or wireless networking hardware, such as a modem, LAN port, wireless fidelity (Wi-Fi) card, WiMax card, mobile communications hardware, and/or other hardware for communicating with other networks and/or devices. Computing platform(s) 202 and/or remote platform(s) 204 may include or may be in communication with input/output hardware including one or more of a graphics display device, keyboard, mouse, printer, camera, microphone, speaker, touch-screen, and/or other device for receiving, sending, and/or presenting data.

A given remote platform 204 may include one or more processors configured to execute computer program modules. The computer program modules may be configured to enable an expert or user associated with the given remote platform 204 to interface with system 200 and/or external resources 236, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 236 may include sources of information outside of system 200, external entities participating with system 200, and/or other resources. In some implementations, some or all of the functionality attributed herein to external resources 236 may be provided by resources included in system 200.

Computing platform(s) 202 may include electronic storage 238, one or more processors 240, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 238 may comprise non-transitory computer-readable media that electronically stores information. The electronic storage media of electronic storage 238 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 238 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 238 may include one or more virtual storage resources (e.g., cloud storage, a virtual private network, and/or other virtual storage resources). Electronic storage 238 may store software algorithms, information determined by processor(s) 240, information received from computing platform(s) 202, information received from remote platform(s) 204, and/or other information that enables computing platform(s) 202 to function as described herein.

Processor(s) 240 may be configured to provide information processing capabilities in computing platform(s) 202. As such, processor(s) 240 may include one or more of a digital processor, an analog processor, a digital circuit designed to process information, an analog circuit designed to process information, a state computer, and/or other mechanisms for electronically processing information. Although processor(s) 240 is shown in FIG. 2 as a single entity, this is for illustrative purposes only. In some embodiments, processor(s) 240 may include a plurality of processing units. These processing units may be physically located within the same device, or processor(s) 240 may represent processing functionality of a plurality of devices operating in coordination. Processor(s) 240 may be configured to execute modules 208, 210, 212, 214, 216, 218, 220, 222, 224, 226, 228, 230, 232, and/or 234, and/or other modules. Processor(s) 240 may be configured to execute modules 208, 210, 212, 214, 216, 218, 220, 222, 224, 226, 228, 230, 232, and/or 234, and/or other modules by software; hardware; firmware; some combination of software, hardware, and/or firmware; and/or other mechanisms for configuring processing capabilities on processor(s) 240. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, 220, 222, 224, 226, 228, 230, 232, and/or 234 are illustrated in FIG. 2 as being implemented within a single processing unit, in embodiments in which processor(s) 240 includes multiple processing units, one or more of modules 208, 210, 212, 214, 216, 218, 220, 222, 224, 226, 228, 230, 232, and/or 234 may be implemented remotely from the other modules. The description of the functionality provided by the different modules 208, 210, 212, 214, 216, 218, 220, 222, 224, 226, 228, 230, 232, and/or 234 described below is for illustrative purposes, and is not intended to be limiting, as any of modules 208, 210, 212, 214, 216, 218, 220, 222, 224, 226, 228, 230, 232, and/or 234 may provide more or less functionality than is described. For example, one or more of modules 208, 210, 212, 214, 216, 218, 220, 222, 224, 226, 228, 230, 232, and/or 234 may be eliminated, and some or all of its functionality may be provided by other ones of modules 208, 210, 212, 214, 216, 218, 220, 222, 224, 226, 228, 230, 232, and/or 234. As another example, processor(s) 240 may be configured to execute one or more additional modules that may perform some or all of the functionality attributed below to one of modules 208, 210, 212, 214, 216, 218, 220, 222, 224, 226, 228, 230, 232, and/or 234.

FIGS. 3A, 3B, 3C, and 3D illustrate example methods for indexing geological features according to one or more embodiments described and illustrated herein. The operations of method 300 presented below are intended to be illustrative. In some embodiments, the methods may be accomplished with one or more additional operations not described, and/or without one or more of the operations discussed. Additionally, the order in which the operations of the methods are illustrated in FIGS. 3A, 3B, 3C, and 3D described below is not intended to be limiting.

The methods may be implemented in one or more processing devices (e.g., a digital processor, an analog processor, a digital circuit designed to process information, an analog circuit designed to process information, a state computer, and/or other mechanisms for electronically processing information). The one or more processing devices may include one or more devices executing some or all of the operations of the methods in response to computer-readable instructions stored electronically on a computer-readable storage medium. The one or more processing devices may include one or more devices configured through hardware, firmware, and/or software to be specifically designed for execution of one or more of the operations of the methods, and such as those described above and illustrated by FIG. 2.

The example methods depicted by FIGS. 3A, 3B, 3C, and 3D are described with reference to the example dataflow diagram 400 depicted by FIG. 4. Aspects of the dataflow diagram 400 are referenced during the description of the example methods 300 depicted by FIGS. 3A, 3B, 3C, and 3D.

Figure 3A:
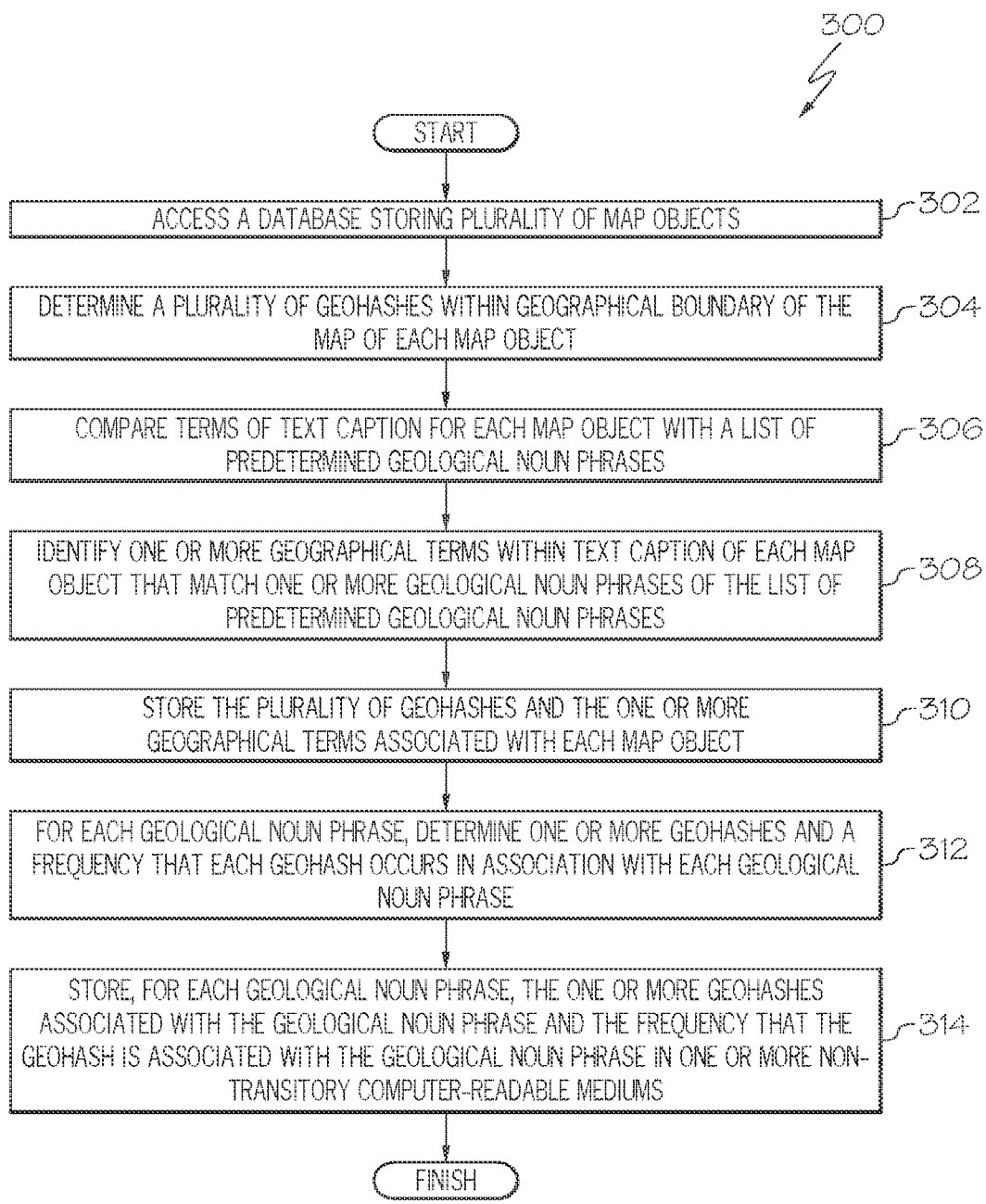
FIG. 3A illustrates an example method for indexing geological features according to one or more embodiments described and illustrated herein.
Figure 4:
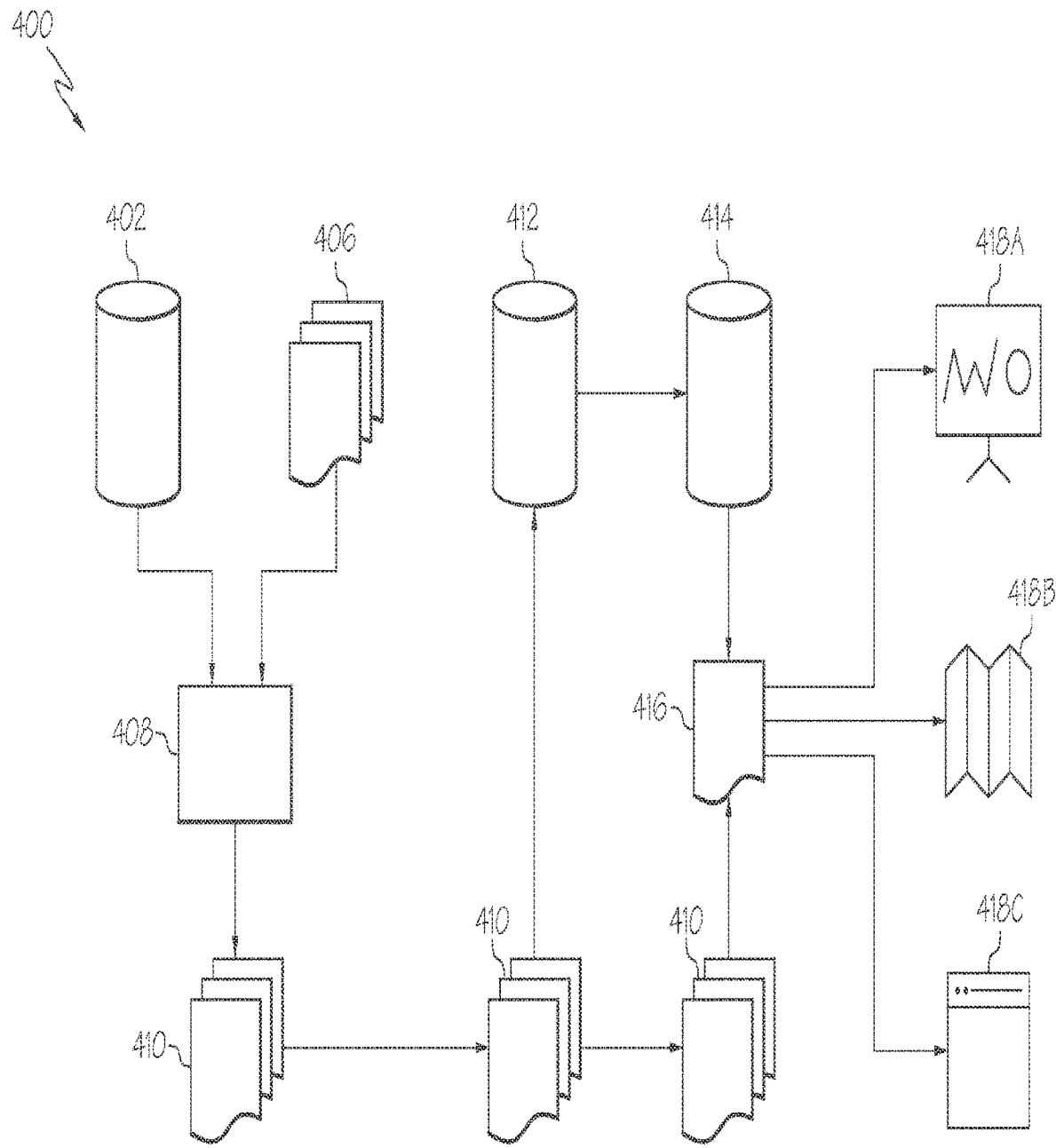
FIG. 4 illustrates an example dataflow diagram of a system for indexing geological features according to one or more embodiments described and illustrated herein.

Referring now to FIGS. 3A and 4, an example method for indexing geological features by geocoding is graphically illustrated. At operation 302, one or more processors access a database 402 storing a plurality of map objects that originate from a plurality of documents. As a non-limiting example, the plurality of documents comprise a plurality of journal articles. Operation 302 may be performed by one or more hardware processors configured by computer-readable instructions including a module that is the same as or similar to database accessing module 208 illustrated by FIG. 2, for example. The database 402 may be stored in the electronic storage 238, for example. Although not shown in FIG. 4, the information from the database 402 may be pre-processed and stored in an intermediate dataframe prior to further steps. The pre-processing may assist in preparing the data for the further steps if it is not stored in a normalized manner within the database 402 (e.g., storing in proper data fields in a normalized format).

As a non-limiting example, the database 402 may include data regarding the plurality of map objects. As used herein, the term "map object" means data regarding maps that are extracted from documents within a document corpus, such as a corpus of journal articles. Maps present in documents are automatically extracted from documents along with data pertaining to the maps. In a non-limiting example, an algorithm executed by one or more processors automatically locates maps within the documents, such by feature detection and extracts the caption(s) associated with each map. Information regarding the maps is also extracted and stored within the database 402 as map object.

Figure 5:
FIG. 5 illustrates an example map of a document.

FIG. 5 illustrates an example map object 500 of a journal article. The map object 500 includes the map 502 itself, as well as the caption text 504: "FIG. 1b: The San Andreas Fault traverses the San Francisco Bay Area." As stated above, information from the map 502 and/or the caption text is extracted and stored as a map object in the database 402 in digital form. Any type of information may be extracted and stored as data fields within the database 402.

As a non-limiting example, a map object may include one or more of the following data fields:
Map ID: An identification number assigned to the map object;
Document Type: Describes the type of document (e.g., journal article, news article, textbook, and the like);
Map Type: Describes the type of map (e.g., a geological map, a structural map, a tectonic map, and the like);
Map Page: References the page number of the document that the map is extracted from;
Caption Text: Text that appears above, below or to the side of the map within the document;
Map Order: References the order of the particular map in a set of maps within the document (e.g., the second map in the document);
Resolution: References the resolution value of the map (e.g., dots-per-inch);
Scale: References a scale of the map;
Legend: References legend information within the map;
Surface Area: Describes a surface area represented by the map;
Basin: References the basin in which the area illustrated by the map resides;
Region: References the region in which the area illustrated by the map resides;
Country: References the country in which the area illustrated by the map resides;
Oil/Gas Field: Indicates whether or not the area illustrated by the map is within an oil or gas field;
Geographic Boundary: Provides geographic coordinates that define a geographical boundary of the map:
  Northwest Coordinate Latitude: The latitude of the northwest point of the boundary;
  Northwest Coordinate Longitude: The longitude of the northwest point of the boundary;
  Southwest Coordinate Latitude: The latitude of the southwest point of the boundary;
  Southwest Coordinate Longitude: The longitude of the southwest point of the boundary;
  Northeast Coordinate Latitude: The latitude of the northeast point of the boundary;
  Northeast Coordinate Longitude: The longitude of the northeast point of the boundary;
  Southeast Coordinate Latitude: The latitude of the southeast point of the boundary;
  Southeast Coordinate Longitude: The longitude of the southeast point of the boundary;
  Center Coordinate Latitude: The latitude of the center point within the boundary; and
  Center Coordinate Longitude: The longitude of the center point within the boundary.

It should be understood that more or fewer data fields may be provided. For example, information regarding map quality, the color of the map (grayscale, color, etc.), data extracted and stored, and any other information may be stored as the map object within the database.

As shown in the examples above, each map is defined by a geographical boundary. Although the geographical boundary is described above as a rectangle (i.e., defined by four corners), embodiments are not limited thereto. For example, the geographical boundary may be a polygon having more than four sides.

At operation 304, a plurality of geohashes within the geographical boundary are determined for each map object. Operation 304 may be performed by one or more hardware processors configured by computer-readable instructions including a module that is the same as or similar to geohash determination module 210 as illustrated by FIG. 2, for example.

Figure 6:
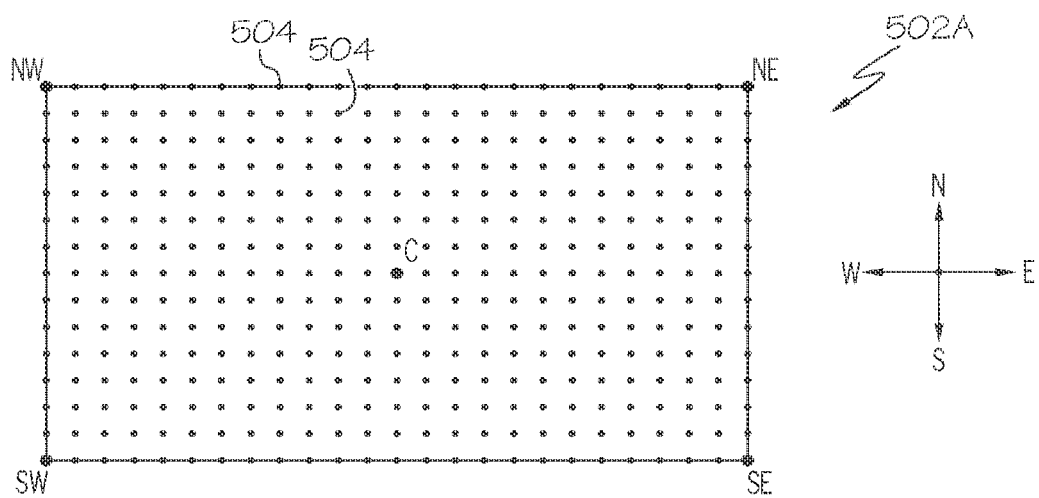
FIG. 6 graphically illustrates a method of generating a set of geohashes for a map object according to one or more embodiments described and illustrated herein.

Referring now to FIG. 6, an example map 502A and a process for determining a plurality of geohashes within the geographical boundary are graphically illustrated. In the illustrated example, the map is bounded by a rectangular geographical boundary defined by northwest coordinates (NW), southwest coordinates (SW), northeast coordinates (NE), and southeast coordinates (SE). The map 502A further includes central coordinates (C). It should be understood that embodiments are not limited to rectangular geographical boundaries.

As shown in FIG. 6, a set of geohashes 404 are provided within the geographical boundary. Each geohash 404 represents a geographical point within the geographical boundary. Any known or yet-to-be developed method of generating geohashes from geographical coordinates may be utilized. As a non-limiting example, the geohash "wqrtr" may represent the geographical coordinates "36.1070° N, 112.1130° W."

The geohashes 404 within the geographical boundary may be determined by any appropriate method. As shown in FIG. 6, the set of geohashes 404 may be in the form of an array. One method of generating the geohashes 404 includes starting at one edge of the geographical boundary and generating a geohash 404 in a line along a direction and stopping when the opposite edge is reached (e.g., starting at a western boundary and proceeding in a line eastward until the eastern boundary is reached). Then the process repeats itself by indexing in a direction that is orthogonal to the original direction to generate a new line of geohashes 404 (e.g., index northward by some amount and form a new line of geohashes 404 from the western boundary to the eastern boundary). This process is repeated until the geographical boundary is filled with geohashes 404, such as shown in FIG. 6. In another example, the process starts from a center of the geographical boundary (e.g., at central coordinates C) and works outward to the edges of the geographical boundary until a set of geohashes fill the geographical boundary. Other approaches to fill the geographical boundary with geohashes are also possible.

As described in more detail below, the plurality of geohashes are then stored in association with the map object from which it is derived.

Referring again to FIG. 3A, at operation 306 terms of the text caption for each map object (or a subset of map objects) are compared with a list of geological keywords 406. Operation 306 may be performed by one or more hardware processors configured by computer-readable instructions including a module that is the same as or similar to term comparing module 212 as illustrated by FIG. 2. The list of geological keywords 406 may be stored in the electronic storage 238, for example.

The geological keywords are noun words (i.e., single words) or phrases (i.e., more than one word) that correspond to geographical features, such as, without limitation, craton, fault, mesa, shield, seamount, and the like. For example, San Andreas Fault is a geological noun phrase that includes the geological keyword "fault" and Great Barrier Reef is a geological noun phrase that includes the geological keyword "reef."

An operation 308 includes, for each map object, identifying one or more geological noun phrases within the text caption that match one or more geological noun phrases of the list of geological keywords 406. Operation 308 may be performed by one or more hardware processors configured by computer-readable instructions including a module that is the same as or similar to term identifying module 214 as illustrated by FIG. 2. Thus, it is determined whether or not the text caption of the map object includes any of the geological keywords. If it does, one or more geological noun phrases of the text caption are associated with the geohashes of that map object and stored by operation 310 as described below. This step is represented by block 408 in FIG. 4.

Operation 310 includes storing the plurality of geohashes and one or more geological noun phrases associated with the map object in one or more files 410 in one or more computer-readable mediums (e.g., electronic storage 238). Operation 310 may be performed by one or more hardware processors configured by computer-readable instructions including a module that is the same as or similar to geohash and noun phrase storing module 216 as illustrated by FIG. 2.

The file 410 therefore includes, for a map object, one or more geological noun phrases and a set of geohashes. In some embodiments, each map object has its own file 410 including the geological noun phrases. Therefore, there are a plurality of files 410 associated with a plurality of map objects stored in the database 402 in a one-to-one relationship. In other embodiments, there is not a one-to-one relationship between map objects and files 410 (e.g., fewer files 410 than map objects). There may be only one file 410 that includes the information for all map objects, or multiple files 410 that cumulatively include the information for all map objects. The files 410 are used in downstream process steps as described below.

As a non-limiting example, the data for each map object is stored as a JavaScript Object Notation (JSON) object stored in one or more JSON files (i.e., files 410). Thus, an individual JSON object includes data for an individual map object (e.g., geological noun phrases and geohashes). Multiple JSON objects are stored within a single JSON file. Depending on the number of map objects, a plurality of JSON files may be utilized.

An operation 312 includes determining, for each geological noun phrase stored in the one or more non-transitory computer-readable mediums, one or more geohashes associated with the geological noun phrase and, for each geohash, determining a frequency that the geohash is associated with the geological noun phrase. Operation 312 may be performed by one or more hardware processors configured by computer-readable instructions including a module that is the same as or similar to the geohash and frequency determination module 218 as illustrated by FIG. 2.

Thus, the method determines one or more geohashes for each geological noun phrase and their frequencies that they are paired with the particular geohash. For example, multiple maps referencing a particular geological feature may occur within several documents. For example, a certain geohash may occur twenty times because it is within twenty map objects. In fifteen of those instances, the map object mentions the geological noun phrase Grand Canyon. Therefore, an index (see second index 414 shown in FIG. 4 and described in more detail below) that is created would store, in one entry, the geological noun phrase "Grand Canyon," the particular geohash, and a frequency of 15. Many other geohashes would also be stored with the geological noun phrase "Grand Canyon" because each map object includes a set of geohashes such as illustrated in FIG. 6.

As further non-limiting examples, an entry for "Mauritanian Margin Study Area" and an entry for "Subducting Cocos Ridge" stored in the index of geological noun phrases may appear as the following:

```
{'mauritanian margin study area': {'ee': 9,
    'ee5v': 9,
    'ee5vy': 9,
    'ee5vz': 9,
    'ee5y': 9,
    'ee5yn': 9,
    'ee5yp': 9,
    'ee5yq': 9,
    'ee5yr': 9,
    'eeh': 9,
    'eehj': 9,
    'eehjb': 9,
    'eehjc': 9,
    'eehjf': 9,
    'eehn': 9,
    'eehn0': 9,
    'eehn1': 9,
    'eehn2': 9,
    'eehn3': 9,
    'eehn4': 9,
    'eehn6': 9,
    'total': 189},
'the subducting cocos ridge': {'d16': 1,
    'd17': 1,
    'd170': 1,
    'd1d': 1,
    'd1d0': 1,
    'd1e': 1,
    'd1e0': 1,
    'd1f': 1,
    'd1f0': 1,
    'd1g': 1,
    'd1g0': 1,
    'd1k': 1,
    'd1k0': 1,
    'd1m': 1,
    'd1m0': 1,
    'd1s': 1,
    'd1s0': 1,
    'd1t': 1,
    'd1t0': 1,
    'd1t00': 1,
    'd1u': 1,
    'd1u0': 1,
    'd1u00': 1,
    'd1v': 1,
    'd1v0': 1,
    'd1v00': 1,
    'total': 26},
```

Each geohash in the plurality of geohashes has a frequency value representing the number of times it appears in association with the particular geological noun phrase. In the above example, the geohash "ee5v" appears with the geological noun phrase "mauritanian margin study area" nine times. In some embodiments, the total number of geohash occurrences for each geological noun phrase may be included in the index.

It is noted that the same geohash may be associated with multiple geological noun phrases. For example, a particular geohash may be fourteen maps that mention the San Andreas Fault, twelve maps that mention a particular river, and six maps that mention a particular park. This geohash would be stored in an entry for each one of these geological features.

Operation 314 stores the entries of the geological noun phrase, the associated geohashes, and the associated frequencies in one or more non-transitory computer-readable mediums, such as in an index as described above. Operation 314 may be performed by one or more hardware processors configured by computer-readable instructions including a module that is the same as or similar to noun phrase storing module 220 as illustrated by FIG. 2. As a non-limiting example, the index is stored as a Python hash.

Figure 3B:
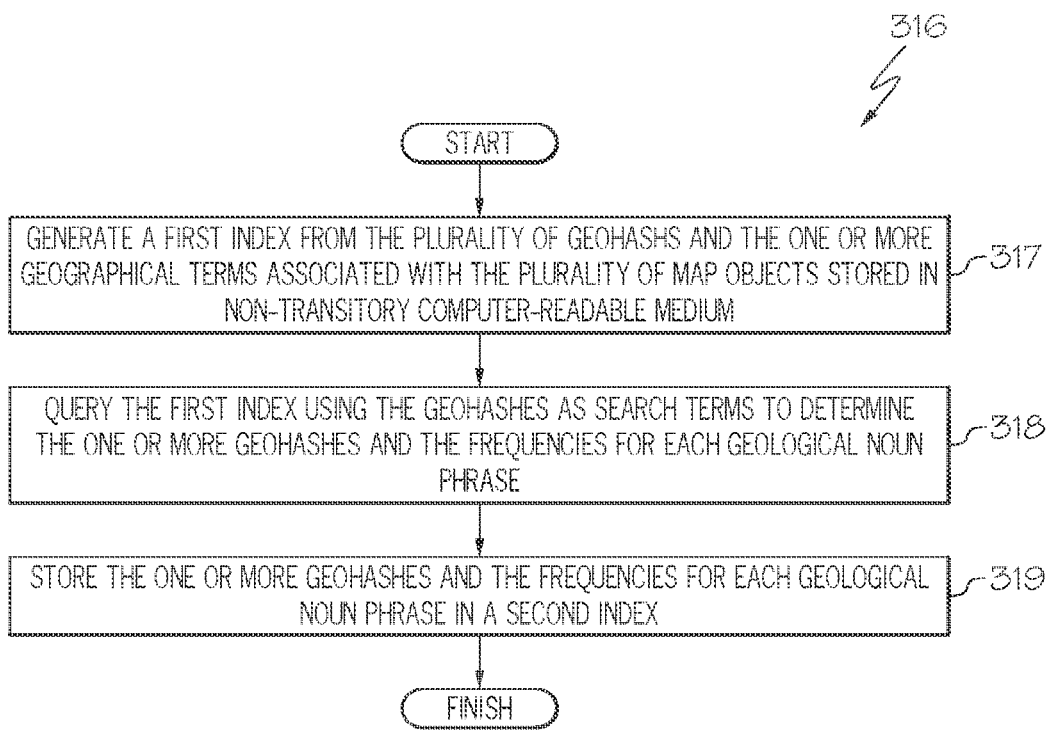
FIG. 3B illustrates an example method for generating indices for indexing geological features according to one or more embodiments described and illustrated herein.

FIG. 3B illustrates an example implementation of method 316 regarding the generation of the index that stores the geological noun phrases, the associated geohashes, and the associated frequencies. Operation 317 includes generating a first index from the plurality of geohashes and the one or more geological noun phrases associated with the plurality of map objects stored in the one or more non-transitory computer-readable mediums. Thus, the raw data that is stored in the one or more files 410 (e.g., the geological noun phrases and the sets of geohashes) is indexed by one or more indexing routines into a first index 412. As non-limiting examples, the first index is an ElasticSearch index, a Solr index or a Mongo index. The first index 412 maps the individual geological noun phrases within the one or more files 410 to the associated geohashes. The first index may be a flat index that maps the geographic noun phrases to geohashes.

Operation 317 may be performed by one or more hardware processors configured by computer-readable instructions including a module that is the same as or similar to index generating module 222 according to one or more embodiments described and illustrated herein.

Next, a second index 416 is generated by querying the first index 412 using geohashes as search terms, wherein the geohashes are derived from the one or more files 410 (operations 318 and 319). Thus, a list of geohashes are derived from the one or more files 410, and each geohash is used as a search term to determine a list and count (i.e., frequency) of geohashes for each geological noun phrase as described above. The second index 416 may be a weighted index that is weighted based on the frequency that the geohash occurs in maps associated with the geological noun phrase.

In some embodiments, the weighting of the index may be defined by metrics other than frequency. For example, more complex metrics may also be stored for each geohash that characterize the particular geohash. In one example, each geohash may have a confidence value associated therewith. The confidence value may be configured to indicate how likely it is that the geohash is located proximate to the geological feature of the geological noun phrase. In some cases, noise may be present in the original data. For example, some caption text within articles may compare a geological feature in the map with a geological feature that is not located near the geological feature in the map. As a specific example, a map in a journal article may be of Waimea Canyon on the island of Kaua'i and the caption may compare Waimea Canyon to the Grand Canyon in Arizona. The geohashes from the map of the Waimea Canyon stored under the geological noun phrase "Grand Canyon" are therefore incorrect and introduce noise. A low confidence value may be associated with such noisy geohashes. Low confidence value geohashes may then be filtered out. Density-based clustering methods may be used to determine the confidence value. In the above example, thousands of geohashes may be associated with the Waimea Canyon in Kaua'i yet only a few may be associated with the Grand Canyon. The density-based clustering may assign these a low confidence value to filter out these outliers.

Other ways of weighting the index are also possible, such as logarithmic weighting, exponential weighting, non-linear scoring, and the like. In another example, a method of determining that the geohashes are associated with the correct geological feature referenced by the geological noun phrase includes evaluating signals from the text of the document itself. If the document discusses more points of reference associated with a first geographical noun phrase than a second geographical noun phrase, then the geohashes are more likely to be correctly associated with the first geographical noun phrase. Using the Waimea Canyon and Grand Canyon example above, if the text of the document referencing both Canyons also makes reference to "island" "Kauai'i" and "Lihue," it is more likely that the geohashes are correctly associated with the Waimea Canyon rather than the Grand Canyon. A low confidence value may be associated with these geohashes associated with the Grand Canyon. The comparison of the geological noun phrase with other names in the document may be done using the files 410, the second index 416 or by referencing some other index that associates nearby geographical entities with one another.

In some embodiments, the final, second index 416 is provided in a file that may be used by downstream applications.

Operations 318 and 319 may be performed by one or more hardware processors configured by computer-readable instructions including a module that is the same as or similar to index generating module 222 and noun phrase storing module 220 as illustrated by FIG. 2.

The second index 416 may be used by a variety of end-user applications 418A, 418B, 418C to perform a variety of functions. In one example, a user may search the second index 416 using a geological noun phrase as a search term, and be returned with a map showing the locations of the geological noun phrase as indicated by the geohashes.

Figure 3C:
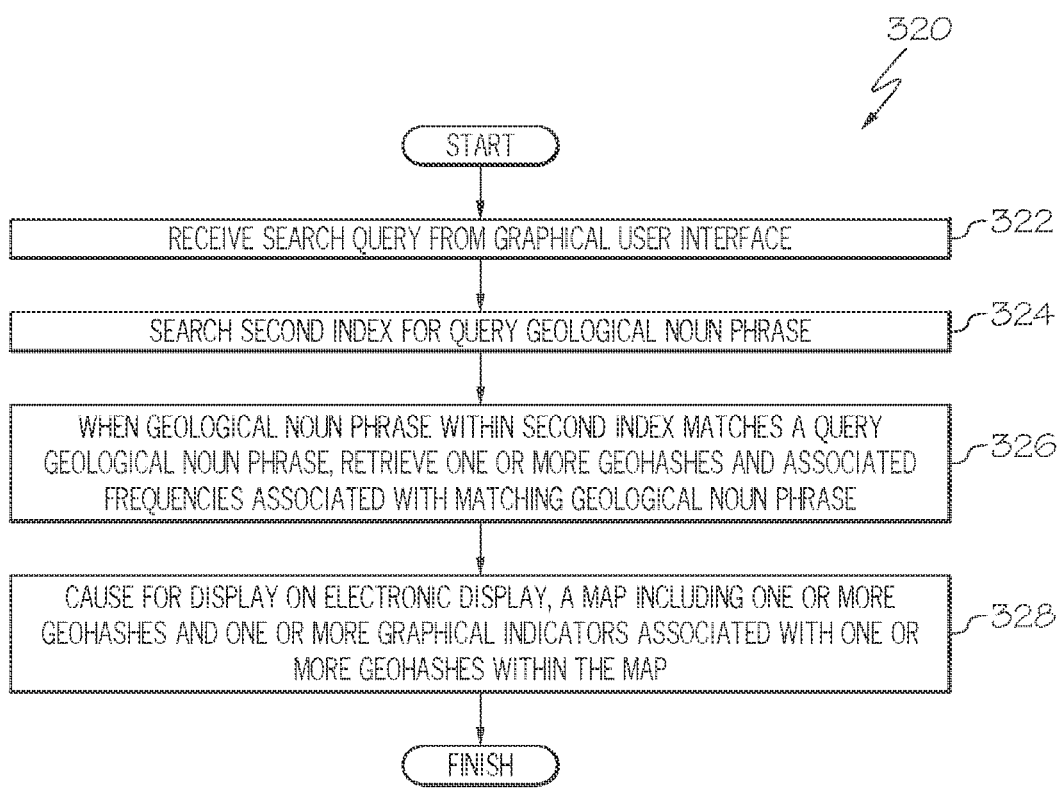
FIG. 3C illustrates an example method of searching an index of geological features to generate a map according to one or more embodiments described and illustrated herein.
Figure 7:
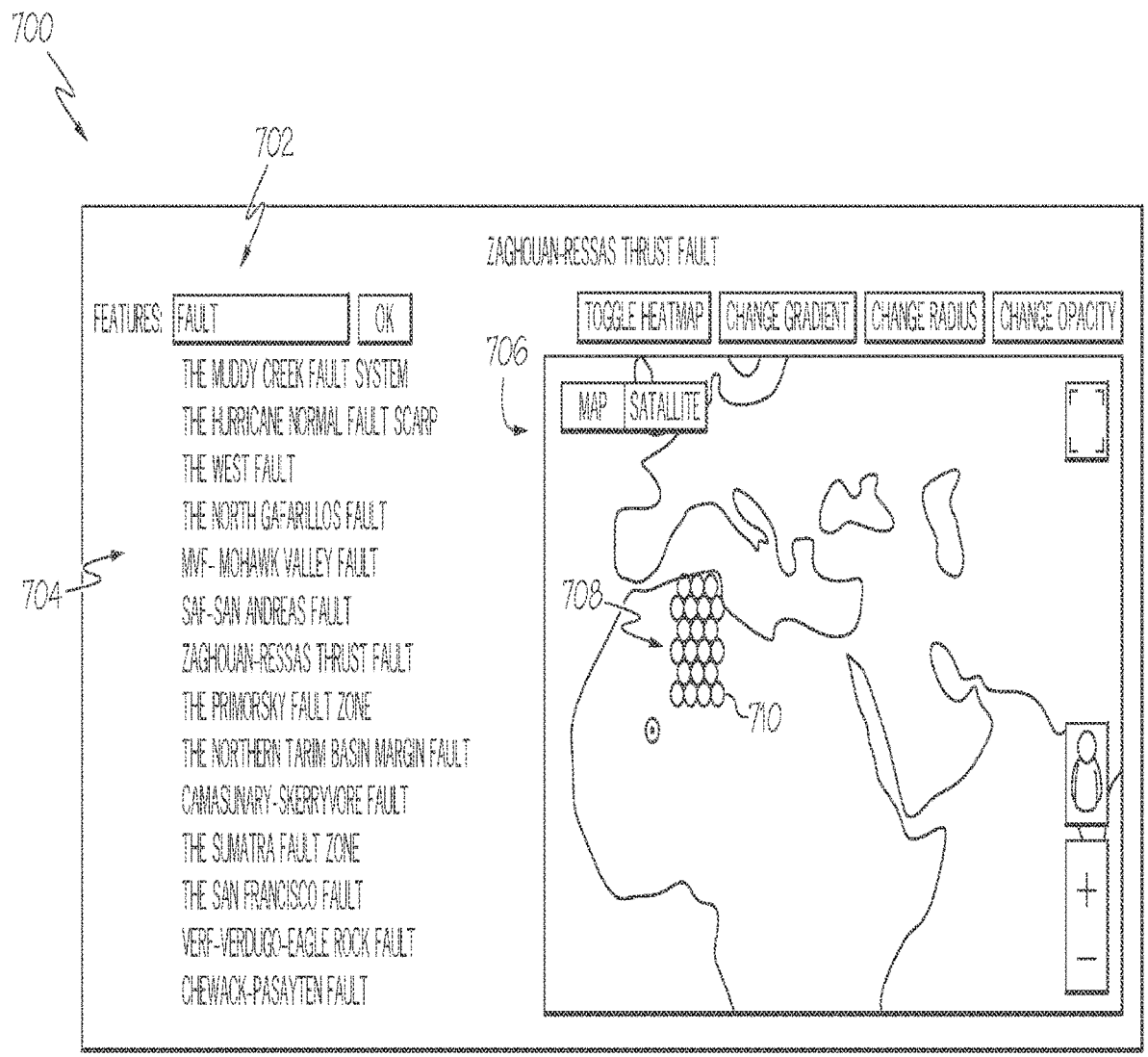
FIG. 7 illustrates an example graphical user interface of an end-user application for utilizing one or more features of the system and method for indexing geological features according to one or more embodiments described and illustrated herein.

FIG. 3C illustrates an example method 320 of a user running a search query against the second index 416 for a desired geological noun phrase. An operation 322 includes receiving a search query from a graphical user interface. FIG. 7 illustrates an example non-limiting graphical user interface 700 for display on an electronic display. The graphical user interface 700 includes a search field 702. The one or more processors receive a search term that is entered into the search field 702 by a user. The search term is a desired geological noun phrase (i.e., a query geological noun phrase). As shown in FIG. 7, the system may auto-suggest geological noun phrases 704 as the user types the search term into the search field 702. In such an example, the user may select one of the auto-suggested geological noun phrases 704.

There may be differences in the way geological noun phrases are spelled or abbreviated across different documents. For example, a first journal article may state "San Andreas Fault" while a second journal article may abbreviate the phrase as "S.A.F." Further, there may be spelling errors in the documents that also create additional possible geological noun phrases that create noise. In some embodiments, only selected, normalized geological noun phrases are presented to the user. Thus, the user is presented with only geological noun feature instead of several variations. In one example, representative geological noun phrases are manually selected. In another example, training data is established by manually reviewing some sub-set of all geological noun phrases to determine what the representative geological noun phrase should look like. Machine learning may then be utilized to determine representative geological noun phrases for the remaining geological noun phrases. In some embodiments, the second index 416 is updated by replacing non-conforming geological noun phrases with the representative geological noun phrases.

Operation 322 may be performed by one or more hardware processors configured by computer-readable instructions including a module that is the same as or similar to search query receiving module 224 as illustrated by FIG. 2.

Next, at operation 324, the second index is searched for the query geological noun phrase. Operation 324 may be performed by one or more hardware processors configured by computer-readable instructions including a module that is the same as or similar to index search module 226 as illustrated by FIG. 2.

When a matching geological noun phrase within the second index matches the query geological noun phrase, one or more geohashes and associated frequencies associated with the matching geological noun phrase are retrieved (operation 326). Operation 326 may be performed by one or more hardware processors configured by computer-readable instructions including a module that is the same as or similar to geohash retrieval module 228 as illustrated by FIG. 2.

In the example of FIG. 7, the query geological noun phrase is "Zaghouan-Ressas thrust fault." The query of the second index 416 retrieves all of the geohashes associated with the Zaghouan-Ressas thrust fault and the frequency at which each of the retrieved geohashes occurs in a map of the Zaghouan-Ressas thrust fault within the documents (i.e., the frequency at which each geohash coincides with the geological noun phrase Zaghouan-Ressas thrust fault as indicated by the second index 416).

An operation 328 includes, when a matching geological noun phrase within the second index matches the query geological noun phrase, causing for display on an electronic display, a map 706 including the one or more geohashes and one or more graphical indicators 710 associated with the one or more geohashes within the map. Operation 328 may be performed by one or more hardware processors configured by computer-readable instructions including a module that is the same as or similar to display causing module 230 as illustrated by FIG. 2.

Thus, the system obtains the one or more geohashes associated with the query geological noun phrase and generates a map 706 of the one or more geohashes that encompasses the locations of the one or more geohashes. FIG. 7 illustrates a map 706 that encompasses the geohashes associated with the geological noun phrase "Zaghouan-Ressas thrust fault" as retrieved from the second index 416. The location of each geohash is indicated on the map by a graphical indictor 710. The graphical indicator may take on any size, shape, or color. The plurality of graphical indicators 710 show a region 708 of the Earth where journal articles discuss the Zaghouan-Ressas thrust fault. In some embodiments, the graphical indicators 710 are configured to reflect the frequency that the one or more geohashes are associated with the query geological noun phrase. For example, geohashes having a higher frequency associated with the query geological noun phrase may appear more prominent than those having a lower frequency. The sizes, shape, and color may be varied among the graphical indicators to reflect frequency. Thus, the map 706 may illustrate a heat map based on the frequency that each geohash is associated with a query geological noun phrase.

In some embodiments, selection of a particular graphical indicator (e.g., by touch or mouse-click) may cause a list of the documents containing the geohash to be displayed. The user may then select one or more articles to view or save. For example, a graphical indicator may be associated with ten journal articles. Selection of the graphical indicator may cause the ten journal articles to be displayed.

Other end-user applications are also possible. For example, a software program may utilize the second index to suggest, and automatically insert, a map (such as the map shown in FIG. 7) into an electronic document as the electronic document is prepared. In such applications, an end user may type a geological noun phrase into an electronic word processing document or slide show presentation. The geological noun phrase may be recognized and extracted from the document as a target geological noun phrase, and further used as a query geological noun phrase that is searched against the second index 416. When a geological noun phrase in the second index 416 matches the target geological noun phrase, the user is presented with an option to insert a map of the target geographical noun phrase with graphical indicators of geohashes into the electronic document. Alternatively, the map may be automatically inserted. The insertion of the map may be performed dynamically as the electronic document is being typed, or it may be a process wherein a selection is made by the user to find any target geological noun phrases present in the electronic document.

Figure 3D:
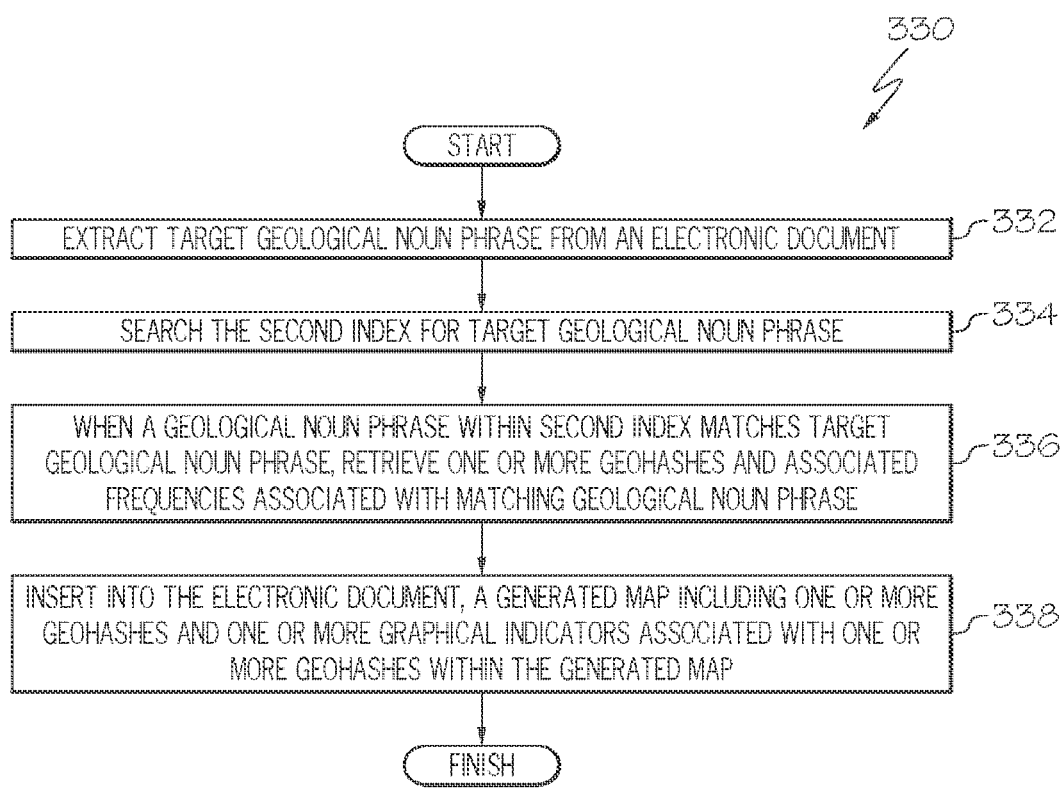
FIG. 3D illustrates an example method for inserting a map of a geological feature into an electronic document according to one or more embodiments described and illustrated herein.

FIG. 3D illustrates an example method 330 for inserting a map into an electronic document in accordance with one or more implementations.

An operation 332 includes extracting a target geological noun phrase from an electronic document. Operation 332 may be performed by one or more hardware processors configured by computer-readable instructions including a module that is the same as or similar to target geological noun phrase extraction module 232 as illustrated by FIG. 2. An operation 334 includes searching the second index for the target geological noun phrase, and may be performed by one or more hardware processors configured by computer-readable instructions including a module that is the same as or similar to index search module 226 as illustrated by FIG. 2

An operation 336 includes, when a matching geological noun phrase within the second index matches the target geological noun phrase, retrieving one or more geohashes and associated frequencies associated with the matching geological noun phrase. Operation 336 may be performed by one or more hardware processors configured by computer-readable instructions including a module that is the same as or similar to geohash retrieval module 228 as illustrated by FIG. 2. Next, operation 338 includes when a matching geological noun phrase within the second index matches the target geological noun phrase, inserting into the electronic document, a generated map including the one or more geohashes and one or more graphical indicators associated with the one or more geohashes within the generated map. Operation 338 may be performed by one or more hardware processors configured by computer-readable instructions including a module that is the same as or similar to document insertion module 234 as illustrated by FIG. 2.

Other end-user applications are also possible. In another example, a customer may provide supplemental documents for geological indexing such that the customer's documents may be retrieved along with journal articles in response to a query. Supplemental documents may include any type of document, such as, without limitation, e-mails, white papers, marketing material, surveys, memoranda, and the like. Supplemental documents may include documents that are internal to the customer, or documents that have been shared or are otherwise publicly available.

These supplemental documents may or may not include maps. However, the indices described herein (e.g., the second index described above) storing the geological noun phrases and the associated geohashes may be used to create geological boundaries for geological noun phrases that appear within the supplemental documents. When a search is run, both journal articles and supplemental documents may be presented to the user.

Figure 3E:
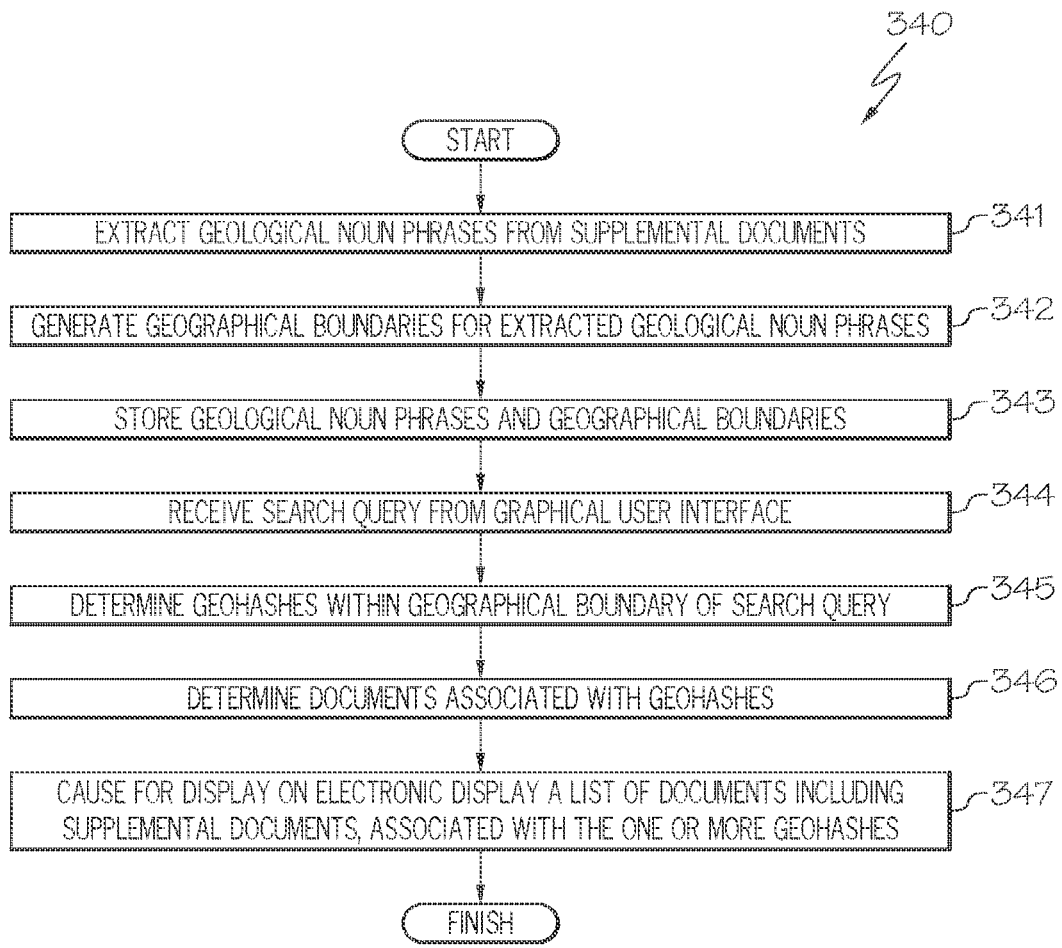
FIG. 3E illustrates an example method for importing supplemental documents into an index of geological features and searching for documents using a selected geographical boundary according to one or more embodiments described and illustrated herein.

FIG. 3E illustrates an example method 340 for indexing and retrieving supplemental documents.

An operation 341 includes extracting geological noun phrases from supplemental documents provided by a customer or other user. Operation 341 may be performed by one or more hardware processors configured by computer-readable instructions including a module that is the same as or similar to supplemental document processing module 236 as illustrated by FIG. 2. As a non-limiting example, the customer or user may upload or otherwise provide the supplemental documents to the system 200. The system may then compare the text of the supplemental documents with the list of geological keywords, and extract any geological noun phrases found within the text of the supplemental documents. Data similar to the map objects described above may be extracted from the supplemental documents, which includes information such as document name, document identification number and the like.

Operation 342 determines a geographical boundary for each of the geological noun phrases that are extracted. Operation 342 may be performed by one or more hardware processors configured by computer-readable instructions including a module that is the same as or similar to supplemental document processing module 236 as illustrated by FIG. 2. The geographical boundary is stored with the map objects as described above. In one example, the geographical boundary is determined by the geohashes associated with the geological noun phrase in the second index 416. For example, the geographical boundary may encompass all (or a subset) of the geohashes associated with the geological noun phrase within the second index 416. The coordinates of the geological boundary for each map object is stored in the files 410 (or, in some embodiments, files specifically for the supplemental documents) (operation 343). These additional map objects derived from the supplemental documents may then be processed according to operations 312 and 314. Thus, data from the supplemental documents are incorporated into the final, second index 416. In an example, the second index includes geological noun phrase and associated geohashes from both journal articles and a user's own database of internal documents (e.g., emails, memoranda, and the like). These supplemental documents (e.g., internal documents) may be retrieved based on a geological noun phrase query as described below.

An operation 344 includes receiving a search query from a graphical user interface. The search query may be similar to the textual search query described above with respect to FIG. 3C. However, in other embodiments, the search query may be a user selecting a polygon or some other boundary (e.g., circle, ellipse, etc.) on a map that is displayed by the graphical user interface.

At operation 345, geohashes within the selected geographical boundary are determined based on the data stored within the second index. For example, the second index 416 may be queried using the coordinates of the selected geographical boundary to find all of the geohashes that are within the selected geographical boundary. The documents (e.g., journal documents and supplemental documents as described above) associated with the geohashes are determined at operation 346. As an example, the second index 416 may store the identification number of each document associated with each geohash. In other embodiments, the geohashes found at operation 345 are used as search terms to search either the files 410 or the first index 412 to determine the documents associated with the geohashes.

In an alternative embodiment at operations 345 and 345, rather than returning geohashes within the boundary, the system retrieves documents having geographical boundaries (e.g., stored in file(s) 410) that overlap with the selected geographical boundary drawn by the user. "Overlap" means that at least a portion of the geographical boundary of the document either partially overlaps the selected geographical boundary, the geographical boundary of the document is totally encompassed by the selected geographical boundary, or the geographical boundary of the document totally encompasses selected geographical boundary. In this example, the selected geographical boundary is not first converted into geohashes.

Operation 347 causes graphical representations of the retrieved documents associated with the geohashes that were found within the selected geographical boundary. As a non-limiting example, the graphical representation may be a list of the names of the retrieved documents such that a user may select a name of a document and the content of the document may be displayed. As another example, the documents may be represented by icons.

Thus, in this example, a user may draw or otherwise select a geographical boundary on a map, and be provided with a list of internal and public documents that reference geological features within the selected geographical boundary.

It should be understood that searching by a geographical boundary may also be employed in embodiments that do not employ supplemental documents.

It should not be understood that the systems and methods described geocode geological features found within electronic documents by extracting maps and captions from data derived from the electronic documents and storing such information in a database. Geological noun phrases regarding geological features of interest (e.g., cratons, rivers, shields, and the like) are extracted from the map captions along with the geological boundaries of the maps. A set of geohashes are determined for each map and are associated with each geological noun phrase in the map caption associated with the map. An index is built that comprises a plurality geological noun phrases and, for geological noun phrase, one or more geohashes and a frequency for which the geohash occurs with (i.e., associated with) the geological noun phrase within all of the data. The index may be utilized for a wide variety of end-user applications, such as the ability to look up geological features using a text search query and receive back a map of the geological feature and articles that reference that geological feature (e.g., a map of the San Andreas Fault and over three-hundred journal articles about the San Andreas Fault). The embodiments of the present disclosure may significantly reduce the amount of processing power required to geocode the maps within the journal articles.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of indexing geological features, the method comprising:
accessing, by a processor, a database storing a plurality of map objects, wherein the plurality of map objects originated from a plurality of documents, and each map object comprises a map defined by a geographical boundary and a text caption;
for each map object, storing a plurality of geohashes within the geographical boundary and one or more geological noun phrases within the text caption in one or more non-transitory computer-readable mediums;
determining, for each geological noun phrase stored in the one or more non-transitory computer-readable mediums, one or more geohashes associated with the geological noun phrase and, for each geohash, determining a frequency that the geohash is associated with the geological noun phrase; and
storing, for each geological noun phrase, the one or more geohashes associated with the geological noun phrase and the frequency that the geohash is associated with the geological noun phrase in the one or more non-transitory computer-readable mediums.

2. The method of claim 1, wherein:
the method further comprises generating a first index from the plurality of geohashes and the one or more geological noun phrases associated with the plurality of map objects stored in the one or more non-transitory computer-readable mediums;
the one or more geohashes and the frequencies associated with each geological noun phrase are determined by querying the first index using at least some geohashes of the plurality of geohashes as search terms; and
the one or more geohashes and the frequencies associated with each geological noun phrase are stored in a second index.

3. The method of claim 2, wherein the second index is a weighted index based on the frequencies.

4. The method of claim 2, further comprising:
receiving a plurality of supplemental documents;
searching the plurality of supplemental documents for geological noun phrases by querying the plurality of supplemental documents using the geographical keywords;
for each geological noun phrase found in the plurality of supplemental documents, storing the document as a map object including the geological noun phrase a geographical boundary encompassing a plurality of geohashes associated with the geological noun phrase.

5. The method of claim 2, further comprising:
receiving, by the processor, a selected geographical boundary that is selected on a map of a graphical user interface;
determining a set of geohashes within the geographical boundary;
determining one or more documents associated with the set of geohashes; and
causing for display a graphical representation of the one or more documents associated with the set of geohashes.

6. The method of claim 2, further comprising:
receiving, by the processor, a selected geographical boundary that is selected on a map of a graphical user interface;
determining one or more documents having a geographical boundary that overlaps the selected geographical boundary; and
causing for display a graphical representation of the one or more documents having a geographical boundary that overlaps the selected geographical boundary.

7. The method of claim 2, further comprising:
receiving a search query from a graphical user interface, wherein the search query comprises a query geological noun phrase;
searching the second index for the query geological noun phrase;
when a matching geological noun phrase within the second index matches the query geological noun phrase:
retrieving one or more geohashes and associated frequencies associated with the matching geological noun phrase;
causing for display on an electronic display, a map including the one or more geohashes and one or more graphical indicators associated with the one or more geohashes within the map.

8. The method of claim 7, wherein the one or more graphical indicators are configured to reflect the frequency that the one or more geohashes are associated with the query geological noun phrase.

9. The method of claim 2, further comprising:
extracting a target geological noun phrase from an electronic document;
searching the second index for the target geological noun phrase;
when a matching geological noun phrase within the second index matches the target geological noun phrase:
retrieving one or more geohashes and associated frequencies associated with the matching geological noun phrase; and
inserting into the electronic document, a generated map including the one or more geohashes and one or more graphical indicators associated with the one or more geohashes within the generated map.

10. The method of claim 9, wherein the one or more graphical indicators are configured to reflect the frequency that the one or more geohashes are associated with the query geological noun phrase.

11. The method of claim 1, wherein the plurality of documents comprises a plurality of journal articles.

12. A system for indexing geological features, the system comprising:
a processor;
a non-transitory computer-readable medium storing computer-readable instructions that, when executed by the processor, causes the processor to:
access a database storing a plurality of map objects, wherein the plurality of map objects originated from a plurality of documents, and each map object comprises a map defined by a geographical boundary and a text caption;
for each map object, store a plurality of geohashes within the geographical boundary and one or more geological noun phrases within the text caption in one or more non-transitory computer-readable mediums;
determine, for each geological noun phrase stored in the one or more non-transitory computer-readable mediums, one or more geohashes associated with the geological noun phrase and, for each geohash, determining a frequency that the geohash is associated with the geological noun phrase; and
store, for each geological noun phrase, the one or more geohashes associated with the geological noun phrase and the frequency that the geohash is associated with the geological noun phrase in the one or more non-transitory computer-readable mediums.

13. The system of claim 12, wherein:
the computer-readable instructions further cause the processor to generate a first index from the plurality of geohashes and the one or more geological noun phrases associated with the plurality of map objects stored in the one or more non-transitory computer-readable mediums;
the one or more geohashes and the frequencies associated with each geological noun phrase are determined by querying the first index using at least some geohashes of the plurality of geohashes as search terms; and
the one or more geohashes and the frequencies associated with each geological noun phrase are stored in a second index.

14. The system of claim 13, wherein the second index is a weighted index based on the frequencies.

15. The system of claim 13, wherein the computer-readable instructions further cause the processor to:
receive a plurality of supplemental documents;
search the plurality of supplemental documents for geological noun phrases by querying the plurality of supplemental documents using the geographical keywords;
for each geological noun phrase found in the plurality of supplemental documents, store the document as a map object including the geological noun phrase a geographical boundary encompassing a plurality of geohashes associated with the geological noun phrase.

16. The system of claim 13, wherein the computer-readable instructions further cause the processor to:
receive, by the processor, a selected geographical boundary that is selected on a map of a graphical user interface;
determine a set of geohashes within the geographical boundary;
determine one or more documents associated with the set of geohashes; and
cause for display a graphical representation of the one or more documents associated with the set of geohashes.

17. The system of claim 13, wherein the computer-readable instructions further cause the processor to:
receive, by the processor, a selected geographical boundary that is selected on a map of a graphical user interface;
determine one or more documents having a geographical boundary that overlaps the selected geographical boundary; and
cause for display a graphical representation of the one or more documents that overlaps the selected geographical boundary.

18. The system of claim 13, wherein the computer-readable instructions further cause the processor to:
receive a search query from a graphical user interface, wherein the search query comprises a query geological noun phrase;

search the second index for the query geological noun phrase;

when a matching geological noun phrase within the second index matches the query geological noun phrase:

retrieve one or more geohashes and associated frequencies associated with the matching geological noun phrase;

cause for display on an electronic display, a generated map including the one or more geohashes and one or more graphical indicators associated with the one or more geohashes within the generated map.

19. The system of claim 18, wherein the one or more graphical indicators are configured to reflect the frequency that the one or more geohashes are associated with the query geological noun phrase.

20. The system of claim 13, wherein the computer-readable instructions further cause the processor to:

extract a target geological noun phrase from an electronic document;

search the second index for the target geological noun phrase;

when a matching geological noun phrase within the second index matches the target geological noun phrase:

retrieve one or more geohashes and associated frequencies associated with the matching geological noun phrase; and insert into the electronic document, a map including the one or more geohashes and one or more graphical indicators associated with the one or more geohashes within the map.

* * * * *